June 26, 1923.
C. M. ANGELL
1,460,010
ISOLATOR FOR BATTERY SEPARATORS
Filed May 26, 1922
Fig. 1.
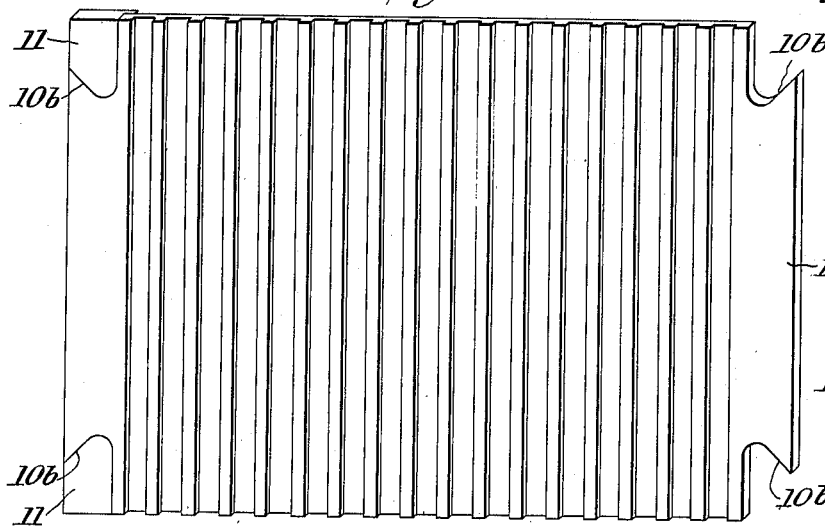
Fig. 2.
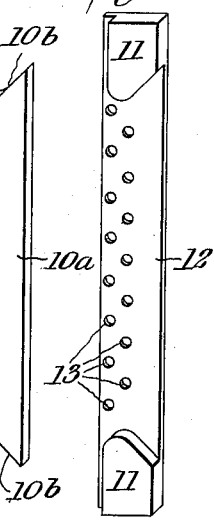
Fig. 3. Fig. 4. Fig. 6. Fig. 5.
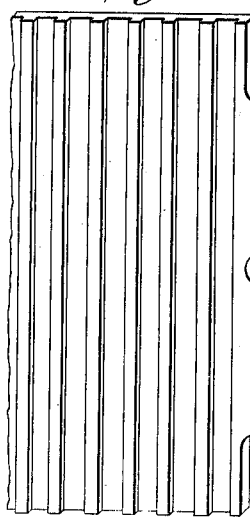 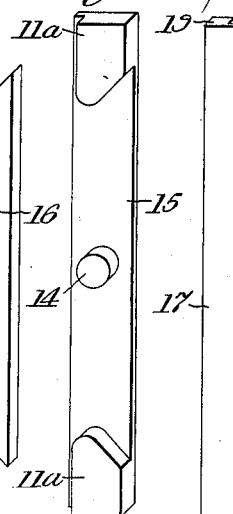 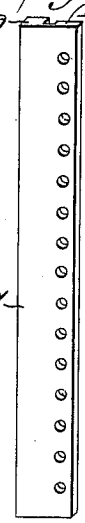 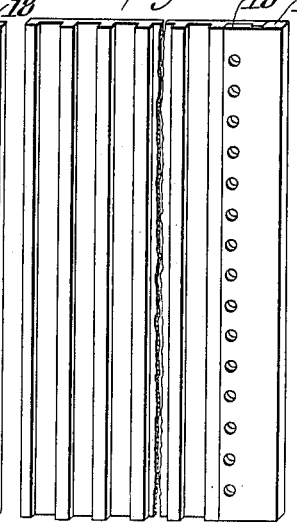
Inventor:
Chester M. Angell,
by Byrnes, Townsend & Brickenstein
Attorneys.

Patented June 26, 1923.

1,460,010

UNITED STATES PATENT OFFICE.

CHESTER M. ANGELL, OF CHICAGO, ILLINOIS, ASSIGNOR TO VESTA BATTERY CORPORATION, OF CHICAGO, ILLINOIS, A CORPORATION OF ILLINOIS.

ISOLATOR FOR BATTERY SEPARATORS.

Application filed May 26, 1922. Serial No. 563,854.

*To all whom it may concern:*

Be it known that I, CHESTER M. ANGELL, a citizen of the United States, residing at Chicago, in the county of Cook and State of Illinois, have invented certain new and useful Improvements in Isolators for Battery Separators, of which the following is a specification.

This invention relates to battery separators.

As it well known, it has been repeatedly proposed to apply various forms of envelopes, buttons, etc., to the separator plates, either superficially or embedded therein. However none of these arrangements has, so far as I am advised, given complete satisfaction or proved practical.

It is the object of this invention to provide plate isolators which, combined with the usual wood separators, will effect complete and lasting separation of the positive and negative plates in a battery.

The invention will be fully described and particularly pointed out in the claims.

For a full understanding of the invention reference is made to the accompanying drawings, in which—

Fig. 1 is a perspective side view of a separator plate embodying the invention;

Fig. 2 is a perspective side view of the isolator constituting the principal feature of the invention;

Fig. 3 is a fragmentary side view in perspective of a modified form of separator plate;

Fig. 4 is, a similar view of an isolator adapted to co-operate with the separator shown in Fig. 3;

Fig. 5 is a side view in perspective of a separator plate and another form of isolator applied at one edge thereof; and Fig. 6 is a similar view of the isolator adapted to be applied at the other edge of the separator shown in Fig. 5.

In the drawings 10 represents a usual form of wood separator placed between positive and negative battery plates. In the marginal portions of the treated separator part of the wood is cut away at the corners defining on the remaining portion $10^a$ dovetail shoulders $10^b$. The isolator comprises blocks 11 formed to replace the cut-away portions and a plate portion 12 interconnecting the blocks 11 and extending over the portion $10^a$.

The isolator is made of hard rubber, celluloid, or other suitable material, as is well understood.

The thickness of the isolator blocks 11 is preferably slightly greater than the thickness of the separator plate and the area of the blocks 11 is sufficient to take and withstand the pressure which is principally exerted upon the marginal portions when the plates are assembled and secured together as a unit.

The plate portion 12 interconnecting the blocks or inserts 11 serves the purpose of preventing a direct path from plate to plate when cracks develop in course of time, as is usually the case, and to prevent short circuits between the plates due to lodgment of active material in openings in the marginal portions $10^a$ or due to the so-called growth of lead trees which often takes place through cracks, knot holes or other imperfections in wood battery separators.

The isolators are so placed that they are practically co-extensive with the frame of solid metal of the plates so that the electrical resistance between the plates is not materially increased.

To form passages for the acid and the current, however, where such provision is deemed advisable, the high resistance plate portion 12 may be punctured at numerous places to provide small perforations 13. Such perforations, suitably placed will allow the passage of acid and electric current, through the impervious isolator material while the cellular structure of the wood covering these holes will prevent the active material from forming short circuits between the plates.

The form of isolator shown in Figs. 3 and 4 includes in addition to the inserts $11^a$, a stud 14 centrally located on plate portion 15 and fitting into a corresponding perforation in the separator 16.

The isolator in both forms is pressed in place on the separator and then the separator is slipped between the plates in the usual manner.

In the form shown in Figs. 5 and 6 no portion of the separator is cut away. The isolator 17 is merely formed to reinforce the marginal portion. The part 18 overlaps the marginal portion of the separator and the portion 19 fits against the edge of the separator. The arrangement is such that, as previously mentioned in connection with the other forms, the isolator takes the mechanical crushing action and wear from the plates, while the wood separators function primarily as electrical insulating mats.

While in the foregoing several forms have been shown in which the invention may be carried out, it is obvious that other forms may readily suggest themselves within the scope of the invention.

I claim:

1. The combination of a battery separator plate and an isolator adjacent the margin thereof, the isolator comprising a portion having substantially the thickness of the separator plate and a relatively thin plate portion extending over the margin of the latter.

2. The combination of a battery separator plate and an isolator adjacent the margin thereof, the isolator comprising a portion having substantially the thickness of the separator and a relatively thin plate portion extending over the margin of the latter, the separator and the isolator being constructed to mechanically interlock against separation in the plane of the separator.

3. The combination of a battery separator plate and an isolator adjacent the margin thereof, the isolator comprising a thick portion having substantially the thickness of the separator plate and a plate portion extending over the margin of the latter, the separator plate having a perforation adapted to receive the said thick portion.

4. The combination of a battery separator plate having portions of its margin cut away defining undercut shoulders, and an isolator having thick portions adapted to fit the cut-away portions and a thin plate portion extending over the margin, the said thick portion having substantially the thickness of the separator plate.

5. Device according to claim 1 in which the plate portion is provided with a number of small perforations.

6. As an article of manufacture, an isolator for battery separator plates, comprising as integral parts a relatively thick portion having substantially the thickness of a separator plate and a relatively thin plate portion adapted to cover the margin of a separator plate.

7. Device according to claim 6 in which the plate portion has a number of small perforations.

8. As an article of manufacture, an isolator for battery separator plates, comprising two relatively thick portions having substantially the thickness of a separator plate and a relatively thin plate portion interconnecting the thick portions.

In testimony whereof, I affix my signature.

CHESTER M. ANGELL.